(12) United States Patent
Taguchi

(10) Patent No.: US 8,240,681 B2
(45) Date of Patent: Aug. 14, 2012

(54) WHEEL SUPPORTING MECHANISM, POST-PROCESSING APPARATUS, AND IMAGE FORMING APPARATUS

(75) Inventor: Tetsuya Taguchi, Osaka (JP)

(73) Assignee: Kyocera Document Solutions Inc., Osaka-Shi, Osaka (JP)

( * ) Notice: Subject to any disclaimer, the term of this patent is extended or adjusted under 35 U.S.C. 154(b) by 319 days.

(21) Appl. No.: 12/401,526

(22) Filed: Mar. 10, 2009

(65) Prior Publication Data
US 2009/0230647 A1  Sep. 17, 2009

(30) Foreign Application Priority Data
Mar. 12, 2008 (JP) .................................. 2008-063367

(51) Int. Cl.
*B62D 61/12* (2006.01)
(52) U.S. Cl. ............ 280/43.2; 280/47.41; 16/19; 16/34
(58) Field of Classification Search .................. 280/6.15, 280/6.153, 87.01, 47.34, 47.41, 79.11, 43, 280/47, 43.17, 43.18, 43.2; 16/19, 29, 32, 16/34
See application file for complete search history.

(56) References Cited

U.S. PATENT DOCUMENTS

| | | | |
|---|---|---|---|
| 2,803,510 A * | 8/1957 | Carbary .................... 312/351.13 |
| 3,179,438 A * | 4/1965 | Field .......................... 280/43.14 |
| 3,534,430 A * | 10/1970 | Livesay et al. ..................... 16/34 |
| 4,783,879 A * | 11/1988 | Weaver .............................. 16/34 |
| 5,347,680 A * | 9/1994 | Rippe ................................ 16/19 |
| 5,558,027 A * | 9/1996 | Williams et al. ................. 109/45 |
| 5,971,408 A * | 10/1999 | Mandel et al. ................ 280/43.2 |
| 6,539,578 B1 * | 4/2003 | Guttmann et al. ................ 16/44 |
| 6,601,806 B2 * | 8/2003 | Wing et al. ................. 248/188.2 |

FOREIGN PATENT DOCUMENTS

| JP | 09-077343 | 3/1997 |
| JP | 2000-044111 | 2/2000 |
| JP | 2002-128369 | 5/2002 |

* cited by examiner

*Primary Examiner* — John Walters
(74) *Attorney, Agent, or Firm* — Knobbe, Martens, Olson & Bear, LLP

(57) ABSTRACT

A wheel supporting mechanism for adjusting height of a housing supported by the wheels is provided. The wheel supporting mechanism includes wheels supporting a housing; an axle extending from each of the wheels; a wheel mounting member, which has a bearing rotatably supporting the axle, and which has a first end portion and a second end portion; a pivot supporting portion, which pivotally supports the wheel mounting member in relation to the housing; a pivot restriction member that restricts pivoting of the wheel mounting member by being engaged with a vicinity of the second end portion; and an adjustment member that adjusts a height of the housing in relation to the wheel by restricting a pivoting range of the wheel mounting member by connecting the pivot restriction member to the housing.

8 Claims, 12 Drawing Sheets

WHEEL SUPPORTING MECHANISM, POST-PROCESSING APPARATUS, AND IMAGE FORMING APPARATUS

CROSS-REFERENCE TO RELATED APPLICATION

This application is based on and claims the benefit of priority from Japanese Patent Application No. 2008-063367, filed on 12 Mar. 2008, the content of which is incorporated herein by reference.

BACKGROUND

1. Field

The present disclosure relates to a wheel supporting mechanism, which supports wheels projected from a bottom face of a housing, and which is capable of adjusting a height of the housing in relation to the wheels.

2. Related Art

Conventionally, a post-processing apparatus has been used in combination with an image forming apparatus main unit such as a copying machine. The post-processing apparatus performs post-processing (stapling, punching, and the like) of paper discharged from the image forming apparatus main unit, and is disposed so as to be connected to a paper outlet side of the image forming apparatus main unit. The image forming apparatus main unit and the post-processing apparatus generally have different weights (the image forming apparatus main unit is heavier in general). Accordingly, in a case where the image forming apparatus, which is configured by connecting the image forming apparatus main unit with the post-processing apparatus, is placed on a relatively soft floor (for example, a floor on which a carpet or the like are laid), the extent to which the image forming apparatus main unit sinks into the floor is different from that of the post-processing apparatus. Thus, in a portion that connects the image forming apparatus main unit with the post-processing apparatus, a significant mismatch is likely to occur in height positions of each (the image forming apparatus main unit and the post-processing apparatus). As a result, adjusting the height positions of each is cumbersome, and it is difficult to smoothly connect each of them, causing a problem in that a forced load acts on parts connecting each.

As technology to solve the aforementioned various problems, for example, the following technology has been disclosed. Japanese Unexamined Patent Application, First Publication No. H09-77343 has proposed a technique in which a long hole is provided in a connecting member on the post-processing apparatus side, thereby absorbing the difference in the height direction between the image forming apparatus main unit and the post-processing apparatus.

However, the technique described in Japanese Unexamined Patent Application, First Publication No. H09-77343 does not improve the mismatch in the height direction at a position at which paper is transferred between the image forming apparatus main unit and the post-processing apparatus. Accordingly, there are concerns with regard to malfunctions such as paper jams (JAM) when paper is transferred paper from the image forming apparatus main unit to the post-processing apparatus.

Japanese Unexamined Patent Application, First Publication No. 2000-44111 has disclosed a technique in which a table consisting of an upper unit and a lower unit is provided under the post-processing apparatus, and the upper unit is vertically moved in relation to the lower unit, thereby adjusting the height position of the post-processing apparatus.

However, according to the technique described in Japanese Unexamined Patent Application, First Publication No. 2000-44111, since the table consisting of the upper unit and a lower unit is provided, configuration of the entire post-processing apparatus is complicated, and the cost is high. Moreover, according to the technique described in Japanese Unexamined Patent Application, First Publication No. 2000-44111, it is impossible to diagonally adjust the height position of the post-processing.

Japanese Unexamined Patent Application, First Publication No. 2002-128369 has disclosed a technique in which a connecting member on post-processing apparatus side is configured to be movable in a vertical direction, thereby absorbing the mismatch between the height position of the image forming apparatus main unit and the post-processing apparatus.

However, the technique described in Japanese Unexamined Patent Application, First Publication No. 2002-128369 does not improve the mismatch in height at the position at which paper is transferred between the image forming apparatus main unit and the post-processing apparatus, as in the case of the technique described in Japanese Unexamined Patent Application, First Publication No. H09-77343. Accordingly, there is concern with regard to malfunctions such as paper jams (JAM) when paper is transferred from the image forming apparatus main unit to the post-processing apparatus.

The aforementioned problems may arise, in some cases, in an apparatus other than the post-processing apparatus of the image forming apparatus.

SUMMARY

Therefore, it is an object of the present disclosure to provide a wheel supporting mechanism, a post-processing apparatus, and an image forming apparatus, which make it possible to easily adjust, with a simple configuration, the height of housing in relation to the wheels, in the wheel supporting mechanism that supports the wheels protruding from the bottom face of the housing and that can adjust the height of the housing in relation to the wheels.

The present disclosure relates to a wheel supporting mechanism that is provided with: a wheel supporting a housing in a state where the wheel protrudes from a bottom face of the housing; an axle extending from the wheel; a wheel mounting member, which has a bearing rotatably supporting the axle, and which has a first end portion and a second end portion that is on an opposite side of the first end portion with the bearing positioned therebetween; a pivot supporting portion, which is provided in a vicinity of the first end portion in the wheel mounting member, and which pivotally supports the wheel mounting member in relation to the housing; a pivot restriction member that restricts pivoting of the wheel mounting member by being engaged with a vicinity of the second end portion; and an adjustment member that adjusts a height of the housing in relation to the wheel by restricting a pivoting range of the wheel mounting member by connecting the pivot restriction member to the housing.

Moreover, the wheel supporting mechanism is preferably as follows: the housing is provided with a through-hole in the bottom face thereof, the wheel mounting member is provided with a first engagement portion in the vicinity of the second end portion, the adjustment member is formed of a screw bolt having a head portion and a shank threaded as a male screw, the pivot restriction member is provided with a female screw portion that screwed into the male screw, and a second engagement portion that is engaged with the first engagement portion, the shank of the screw bolt is screwed into the female screw portion through the through-hole, and the head portion is engaged with a peripheral portion of the through-hole, thereby connecting the pivot restriction member to the housing so as to be movable in a height direction, and the screw bolt is rotated, to adjust a movable range of the pivot restriction member, and to restrict a pivoting range of the wheel mounting member.

Moreover, the wheel supporting mechanism is preferably provided with a locking member, which locks the vicinity of the second end portion above the wheel mounting member, and which restricts pivoting of the wheel mounting member.

Moreover, the wheel supporting mechanism is preferable is follows: the housing is provided with a scale, the pivot restriction member is provided with a scale indication member, the scale indication member is movable along the scale, and height of the pivot restriction member in relation to the housing can be visually confirmed by aligning the scale indication member with the scale.

Moreover, the wheel supporting mechanism is preferably as follows: the housing is provided with a scale, the pivot restriction member is provided with a scale indication member, the scale indication member is movable along the scale, and height of the pivot restriction member in relation to the housing can be visually confirmed by aligning the scale indication member with the scale.

Moreover, the wheel supporting mechanism is preferably as follows: the wheel mounting member has a top face portion, and the top face portion is provided with a top face opening, through which a top part of the wheel can protrude above the top face of the wheel mounting member.

Moreover, the wheel supporting mechanism is preferably as follows: a plurality of the wheels is provided to the housing, and the pivot restriction member is provided to all the wheels correspondingly, and independently restricts the pivoting of the wheel mounting member.

Moreover, a post-processing apparatus of the present disclosure relates to a post-processing apparatus of an image forming apparatus, which is provided with: the wheel supporting mechanism.

Moreover an image forming apparatus of the present disclosure relates to an image forming apparatus that is configured by connecting: an image forming apparatus main unit; and a post-processing apparatus that is provided with the wheel supporting mechanism.

According to the disclosure, it is possible to easily adjust, with a simple configuration, the height of the housing in relation to the wheels, in the wheel supporting mechanism, which supports the wheels protruding from the bottom face of the housing, and which can adjust the height of the housing in relation to the wheels.

DETAILED DESCRIPTION

Figure 1:
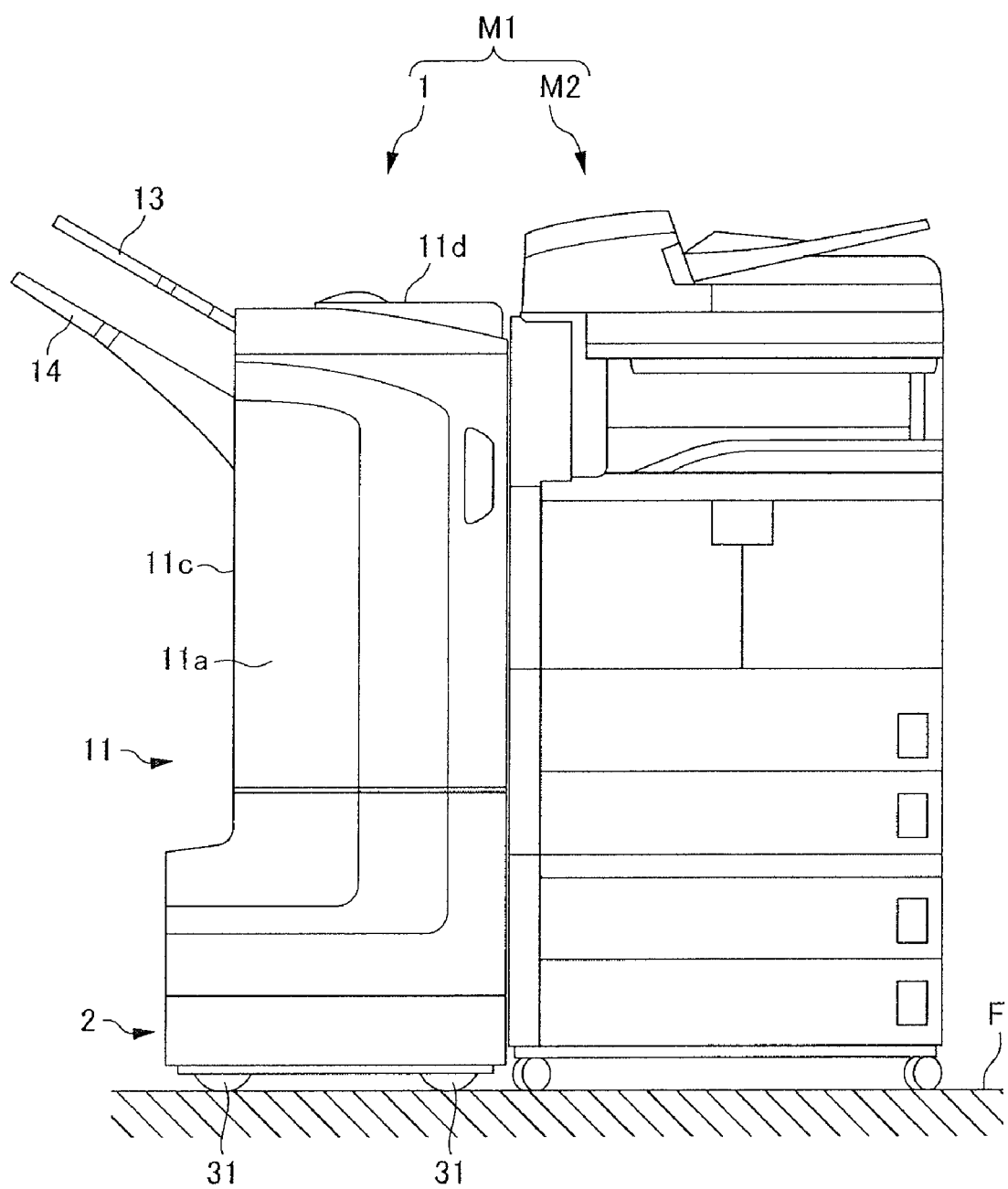
FIG. 1 is a front view of an image forming apparatus according to an embodiment of the present disclosure.
Figure 2:
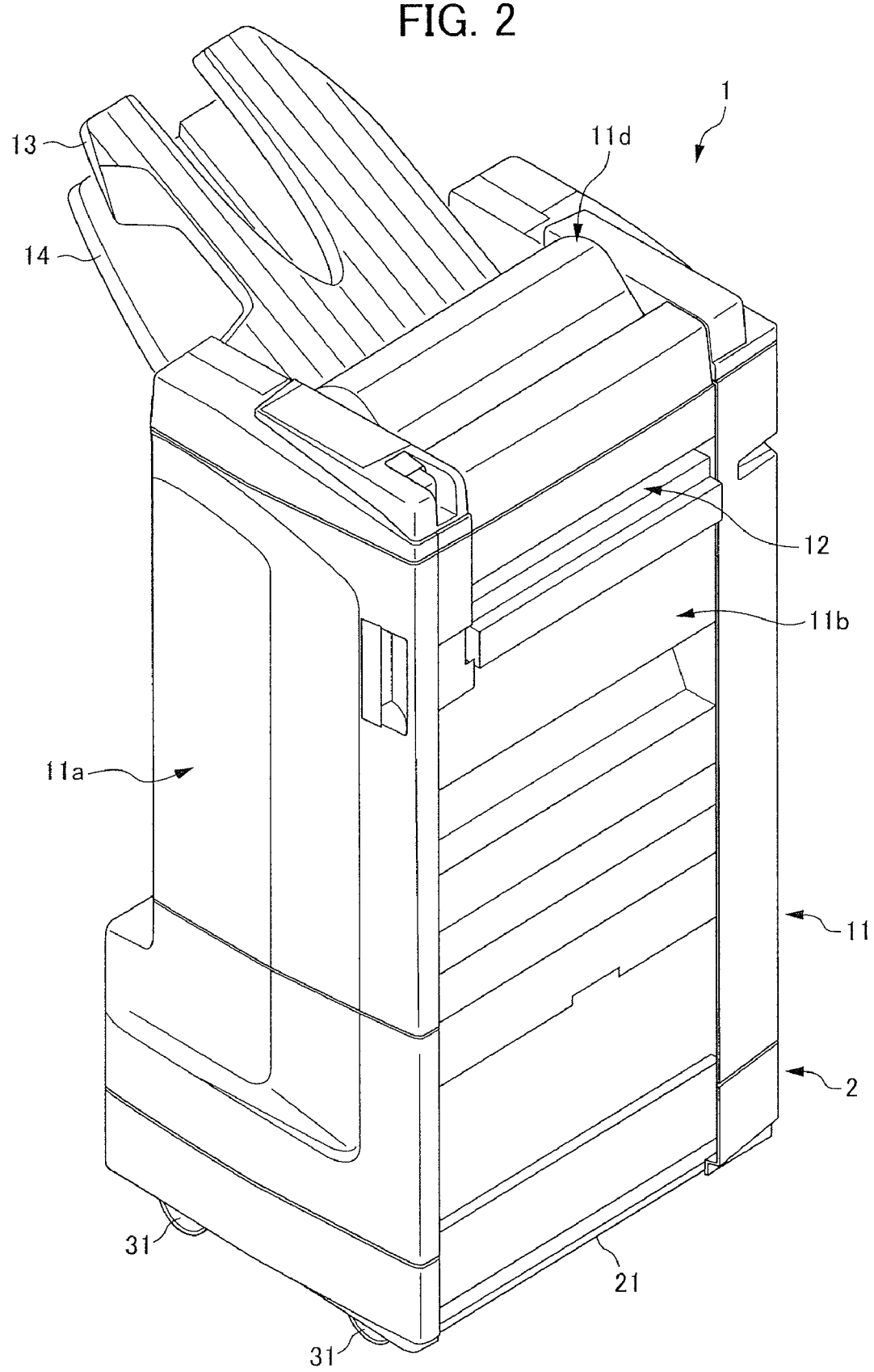
FIG. 2 is a perspective view of a post-processing apparatus of one embodiment of the present disclosure, seen from a side thereof, connected to the image forming apparatus main unit M2.

The best mode for carrying out the disclosure is hereinafter described with reference to the drawings. An overview of one embodiment of an image forming apparatus M1 of the present disclosure is described with reference to FIG. 1. FIG. 1 is a front view of the image forming apparatus M1 according to an embodiment of the present disclosure. FIG. 2 is a perspective view of a post-processing apparatus 1 of one embodiment of the present disclosure, seen from a side thereof, connected to a image forming apparatus main unit M2.

As shown in FIG. 1, the image forming apparatus M1 of the present embodiment is configured by connecting the image forming apparatus main unit M2 with the post-processing apparatus 1. The image forming apparatus main unit M2 is a main part in the image forming apparatus M1, such as a copying machine or a MFP (MultiFunction Printer/Product/Peripheral). The image forming apparatus main unit main unit M2 forms an image on paper, and discharges the paper on which the image has been formed, from an outlet (not shown).

The post-processing apparatus 1 is placed so as to be connected to the outlet side of the image forming apparatus main unit M2. The post-processing apparatus 1 performs post-processing (stapling, punching, and the like) of the paper discharged from the image forming apparatus main unit M2. A wheel supporting mechanism 15 of the present embodiment is provided to the bottom (a base portion 2) of the post-processing apparatus 1.

As shown in FIG. 1 and FIG. 2, the post-processing apparatus 1 of the present embodiment is configured by mounting various members (not shown) inside a housing 11 that is substantially shaped like a box when seen as a whole, the members performing the post processing on the paper discharged from the image forming apparatus main unit M2.

The post-processing apparatus 1 is used by being connected to the left side of the image forming apparatus main unit M2. In the post-processing apparatus 1, the front-back direction is defined as a direction vertically penetrating FIG. 1, and the left-right direction is defined as the horizontal direction in FIG. 1.

As shown in FIG. 1 and FIG. 2, the post-processing apparatus 1 is provided with a mainframe (not shown) that is shaped like a box, and is configured by mounting various members to this mainframe. Specifically, the post-processing apparatus 1 is configured by mounting the following members of the post-processing apparatus 1 to the mainframe: a front surface member forming a front face 11a; a bottom surface member 21 forming a bottom face 21a; a right side surface member forming a right side 11b; a left side surface member forming a left side 11c; a top surface member forming a top face 11d; and a back surface member forming a back face (not shown).

A paper receiving port 12 is provided to an upper part of the right side 11b of the post-processing apparatus 1. The paper receiving port 12 is an inlet for receiving paper discharged from the image forming apparatus main unit M2 into the inside of the post-processing apparatus 1. The paper is introduced into the inside of the post-processing apparatus 1 via the paper receiving port 12.

A main tray 14 and a sub tray 13 are provided to the left side 11c of the post-processing apparatus 1. The bottom of the housing 11 consists of the base portion 2. The wheel supporting mechanism 15 of the present embodiment is provided to the base portion 2 (see FIG. 6, FIG. 7 and the like). The wheel supporting mechanism 15 supports the wheels 31 to the housing 11 (base portion 2), and capable of adjusting the height of the housing 11 in relation to the wheels 31 that protrude from the bottom face 21a of the housing 11.

Figure 3:
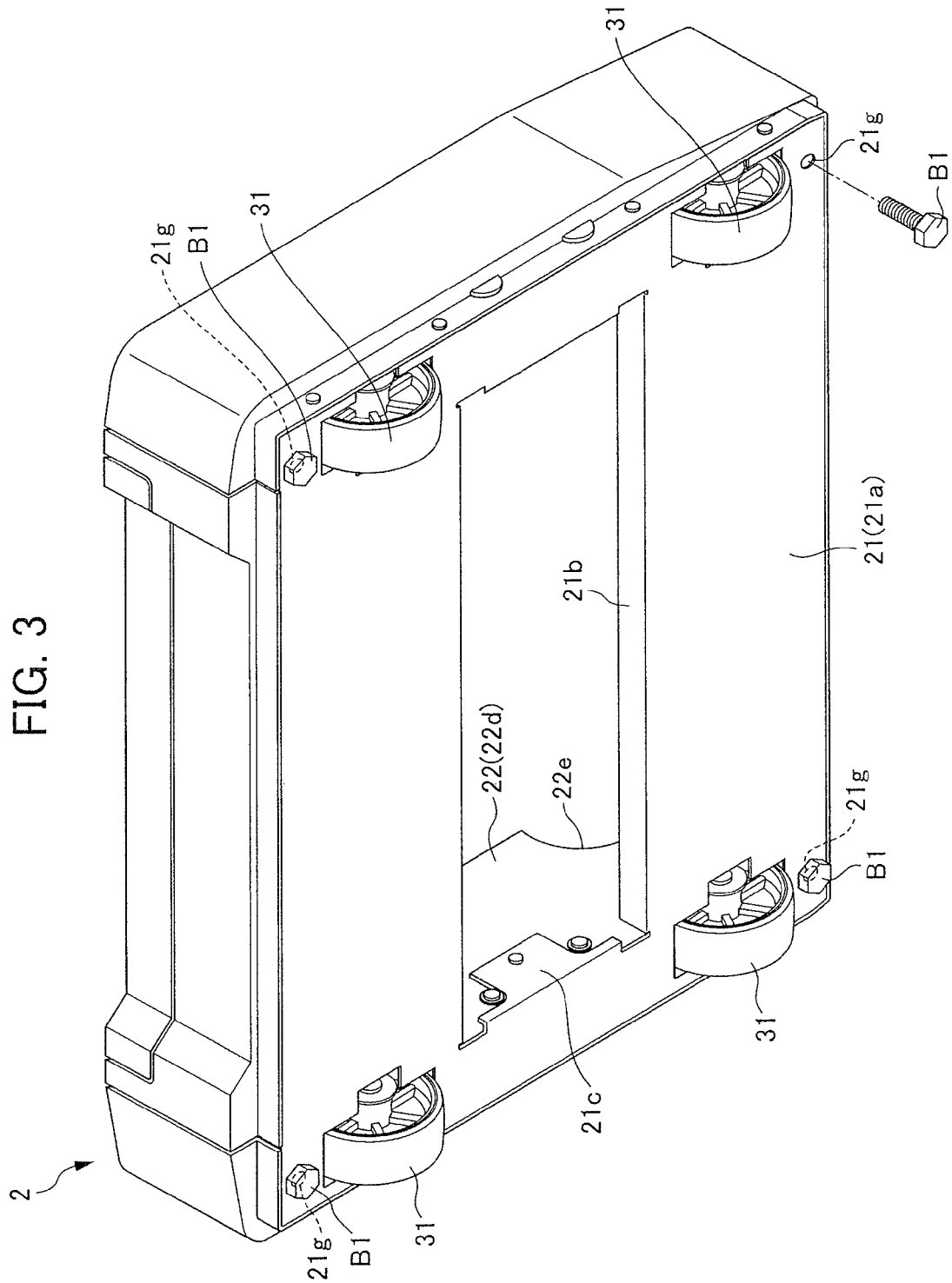
FIG. 3 is a perspective view seen from a lower side of a base portion of the post-processing apparatus shown in FIG. 2.
Figure 4:
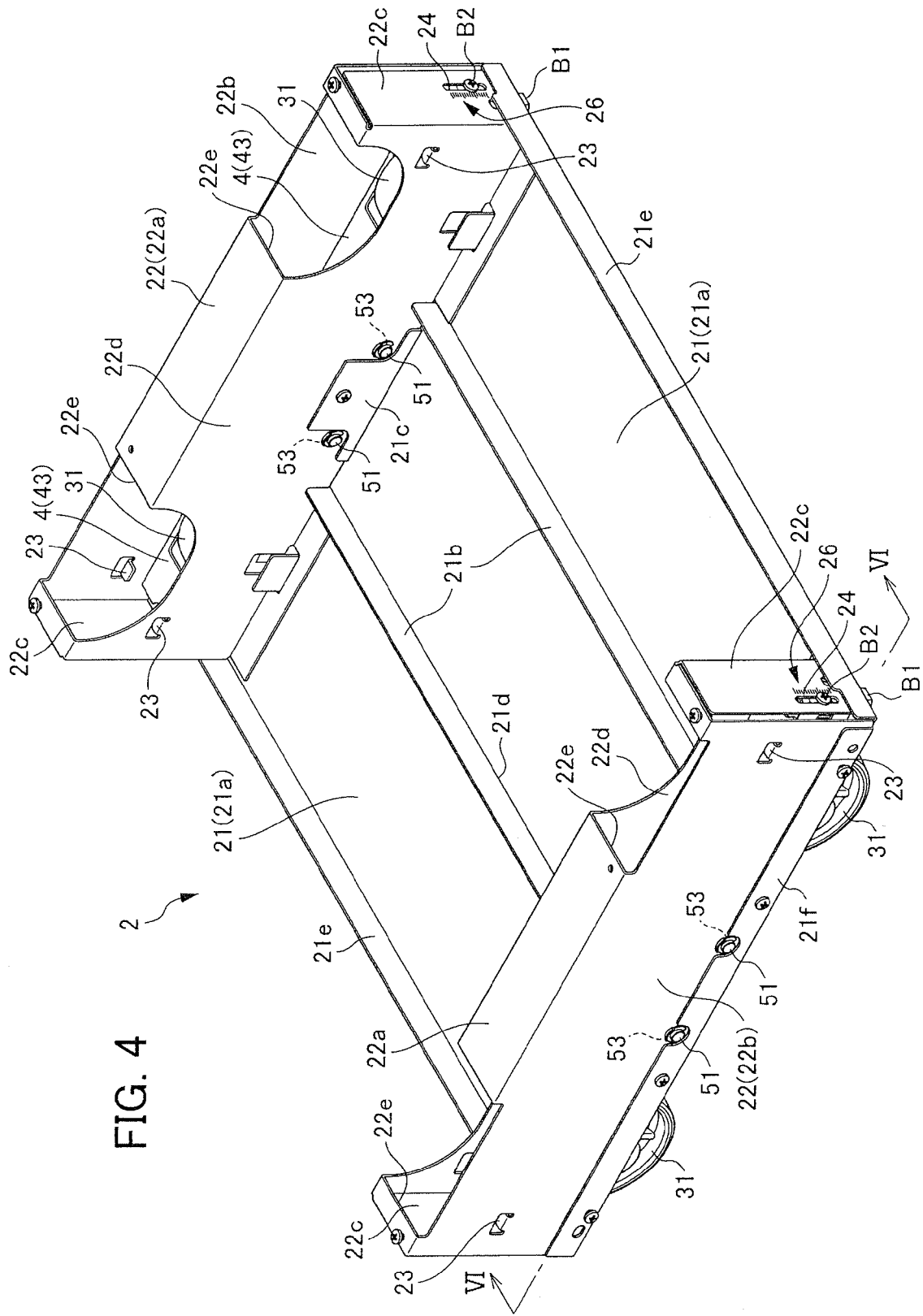
FIG. 4 is a perspective view seen from an upper side of the base portion in a state where an outer casing is removed.
Figure 5:
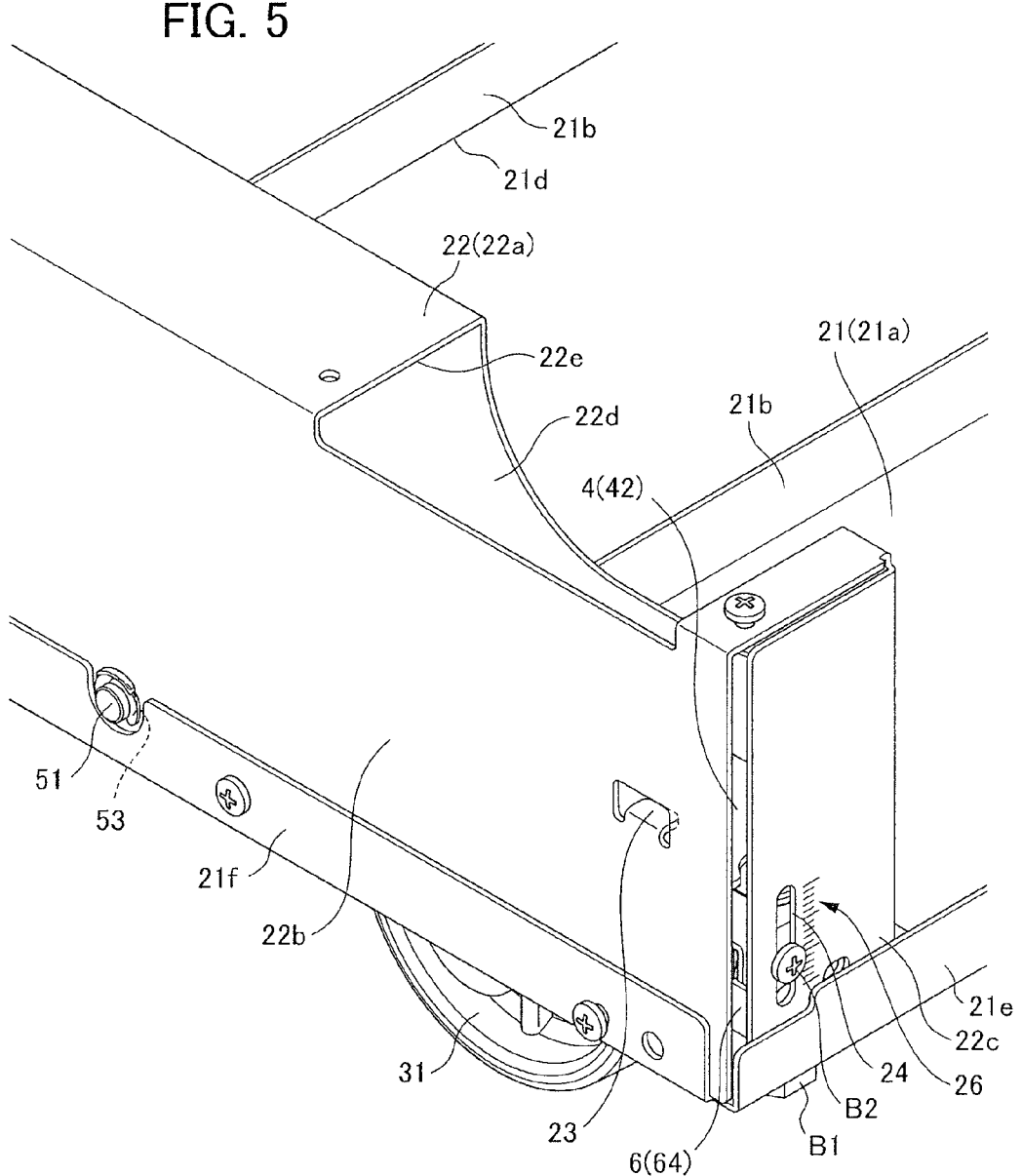
FIG. 5 is a partial enlarged view of the base portion shown in FIG. 3.
Figure 6:
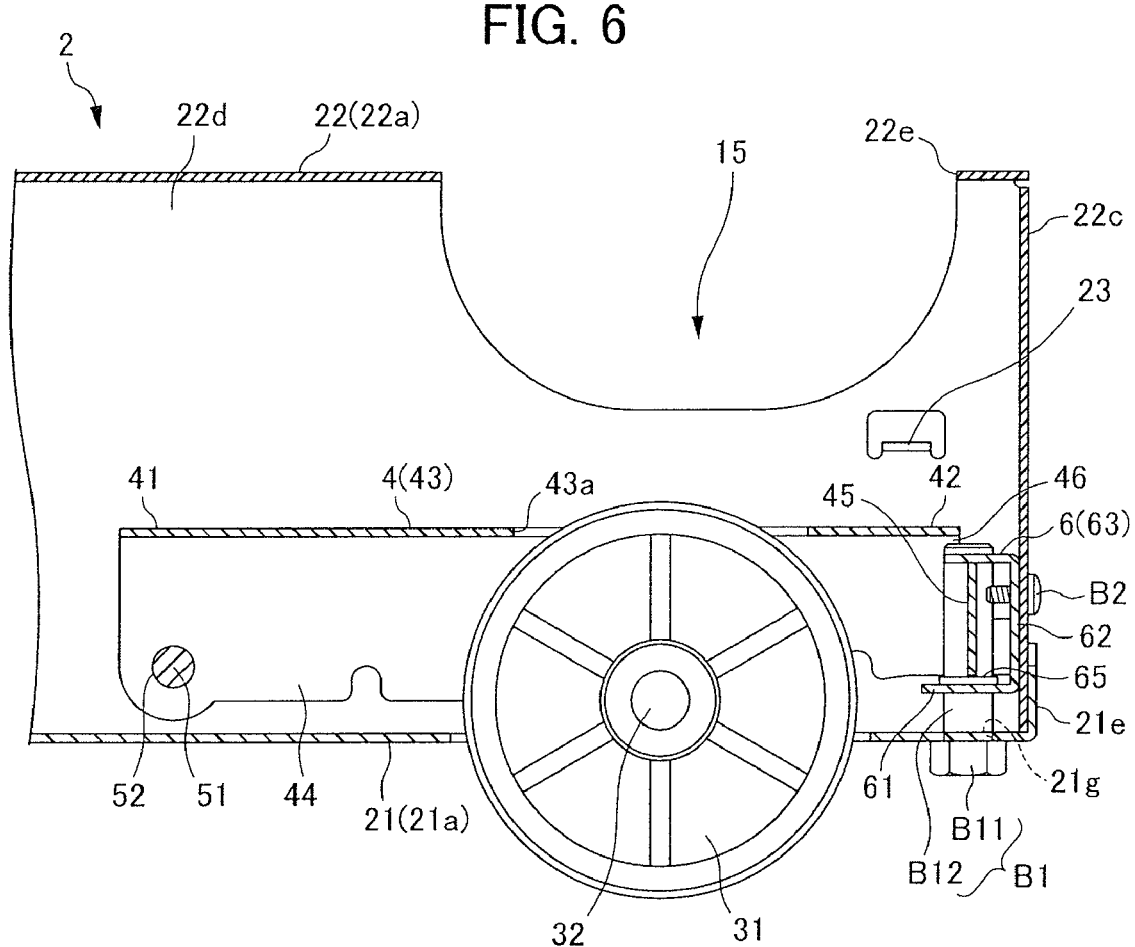
FIG. 6 is a cross-sectional view taken along a line VI-VI shown in FIG. 4.
Figure 7:
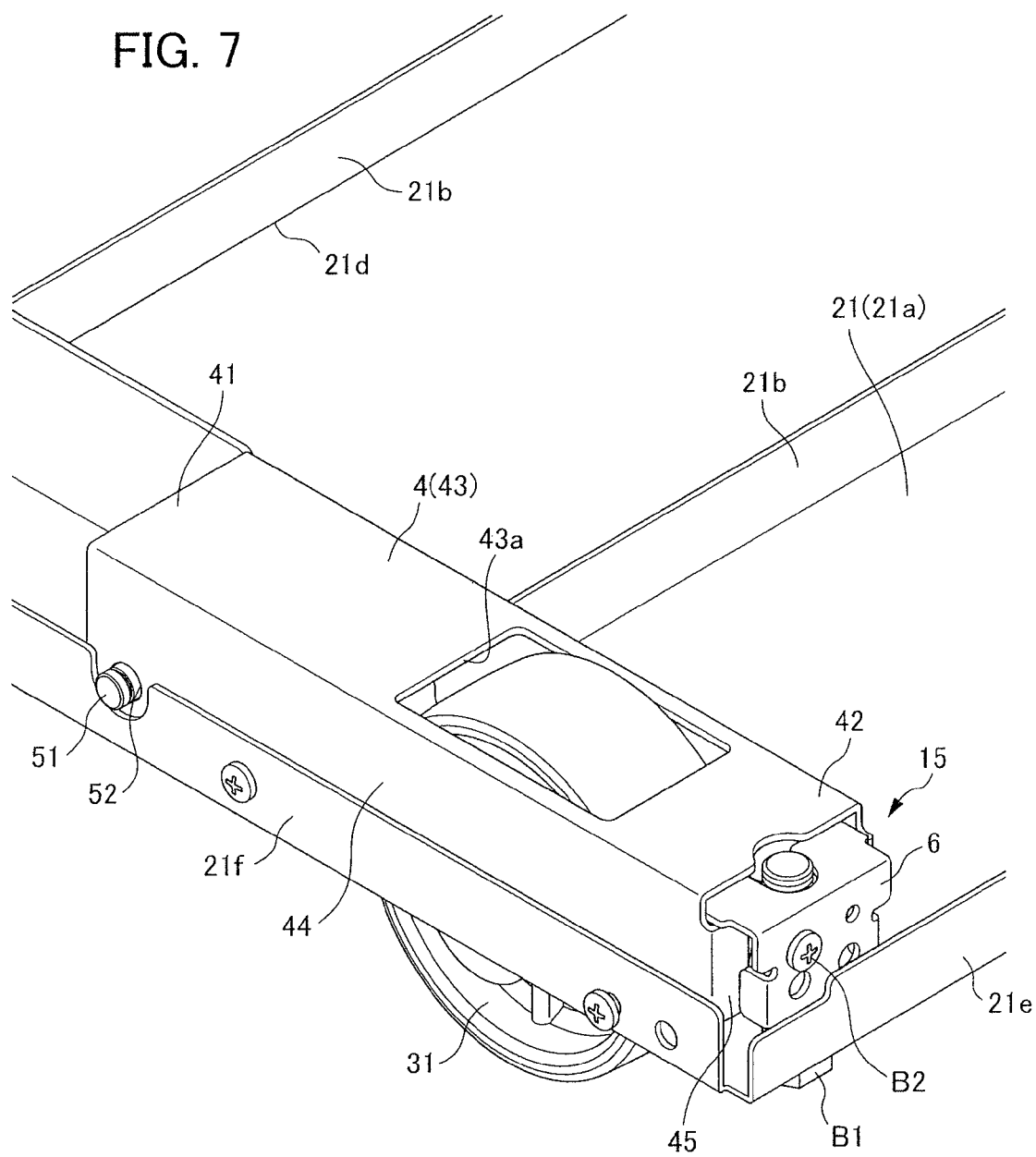
FIG. 7 is a view showing a state where a wheel enclosure member is removed from the state shown in FIG. 5.
Figure 8:
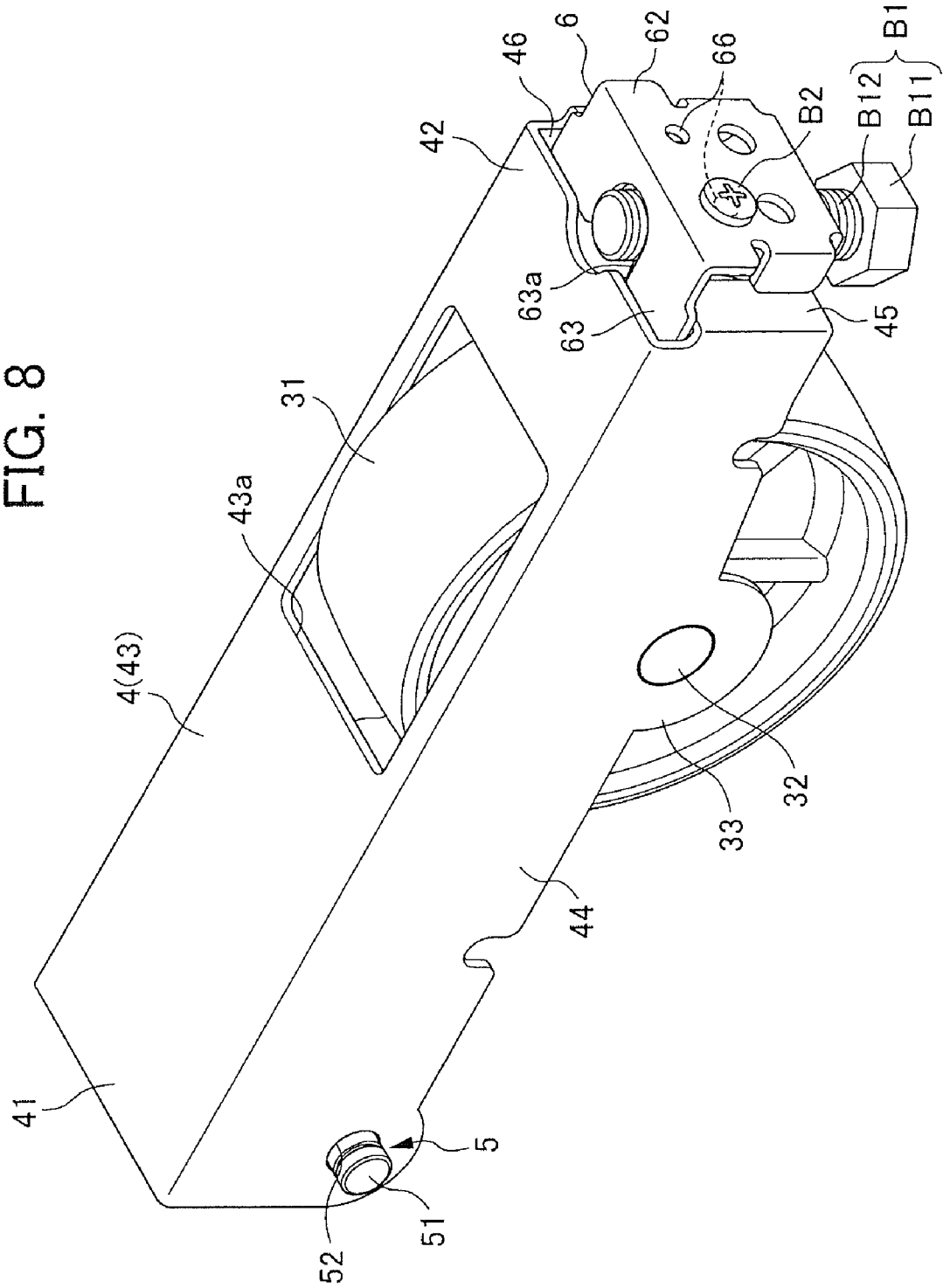
FIG. 8 is a view showing a state where a bottom surface member and the like are removed from the state shown in FIG. 7.

Next, the base portion 2 provided with the wheel supporting mechanism 15 of the present embodiment is described with reference to FIG. 3 to FIG. 12. FIG. 3 is a perspective view seen from a lower side of the base portion 2 of the post-processing apparatus 1 shown in FIG. 2. FIG. 4 is a perspective view seen from an upper side of the base portion 2 in a state where an outer casing is removed. FIG. 5 is a partial enlarged view of the base portion 2 shown in FIG. 3. FIG. 6 is a cross-sectional view taken along a line VI-VI shown in FIG. 4. FIG. 7 is a view showing a state where a wheel enclosure member 22 is removed from the state shown in FIG. 5. FIG. 8 is a view showing a state where the bottom surface member 21 and the like are removed from the state shown in FIG. 7.

Figure 9:
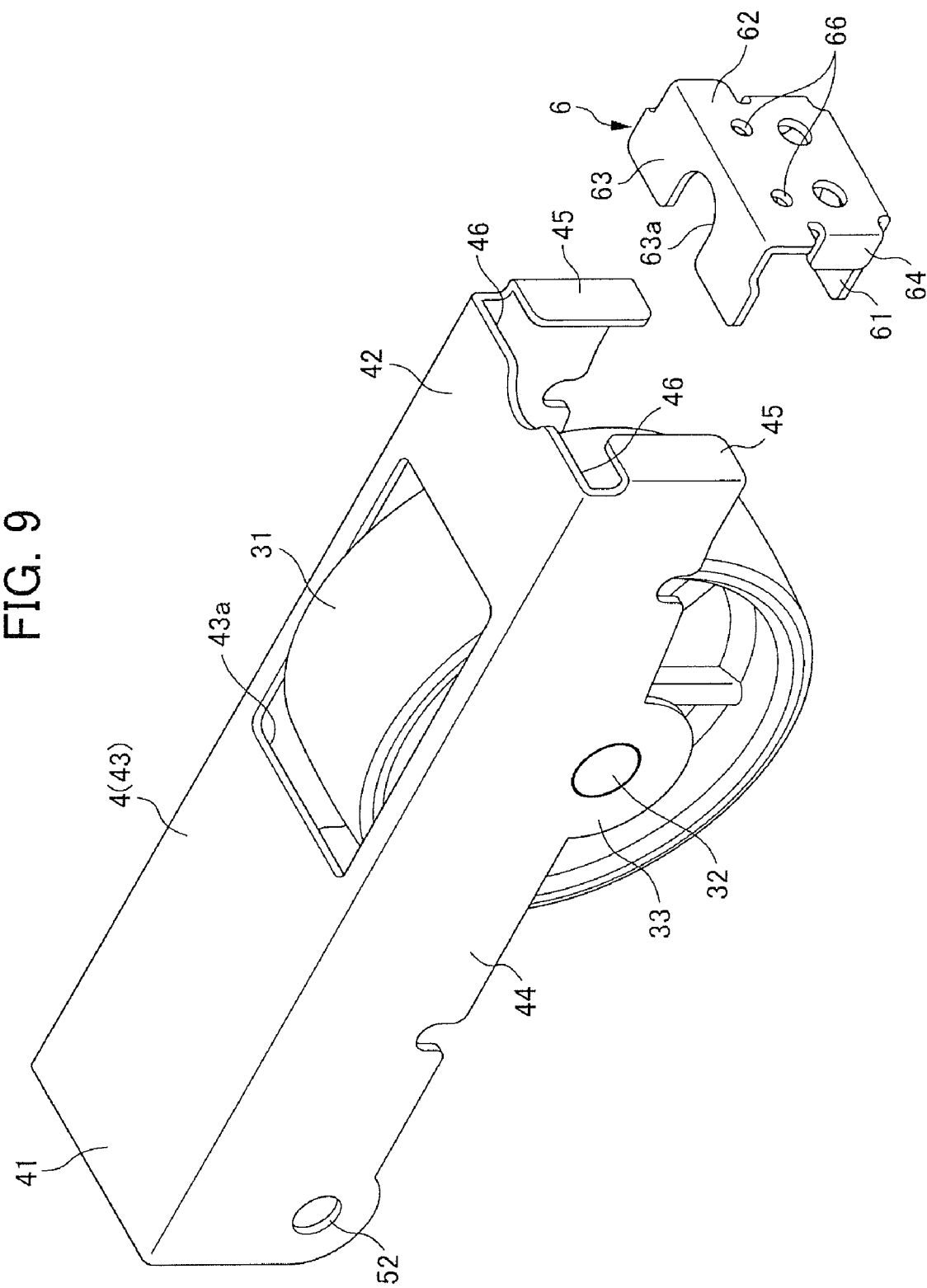
FIG. 9 is a view showing a state where a pivot restriction member is detached from a wheel mounting member.
Figure 10A:
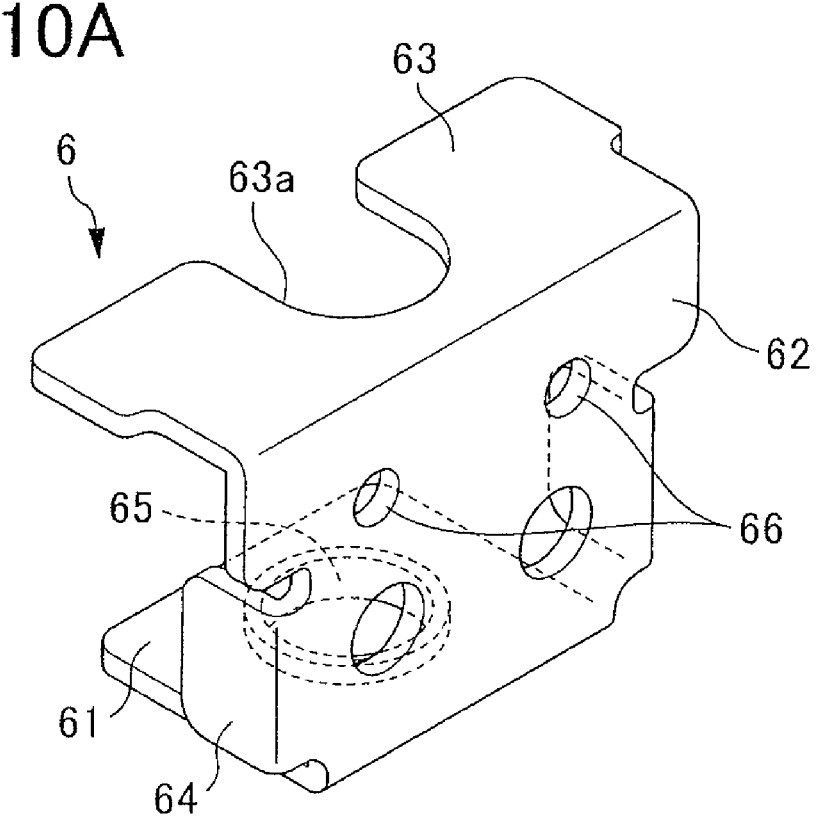
FIG. 10A is a perspective view of the pivot restriction member.
Figure 10B:
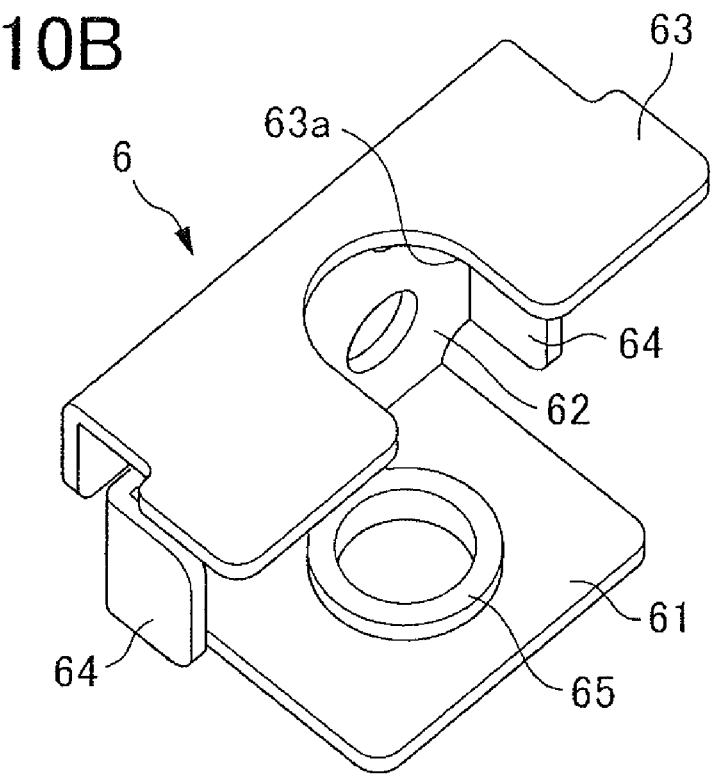
FIG. 10B is a perspective view of the pivot restriction member seen from an opposite side of FIG. 10A.
Figure 11:
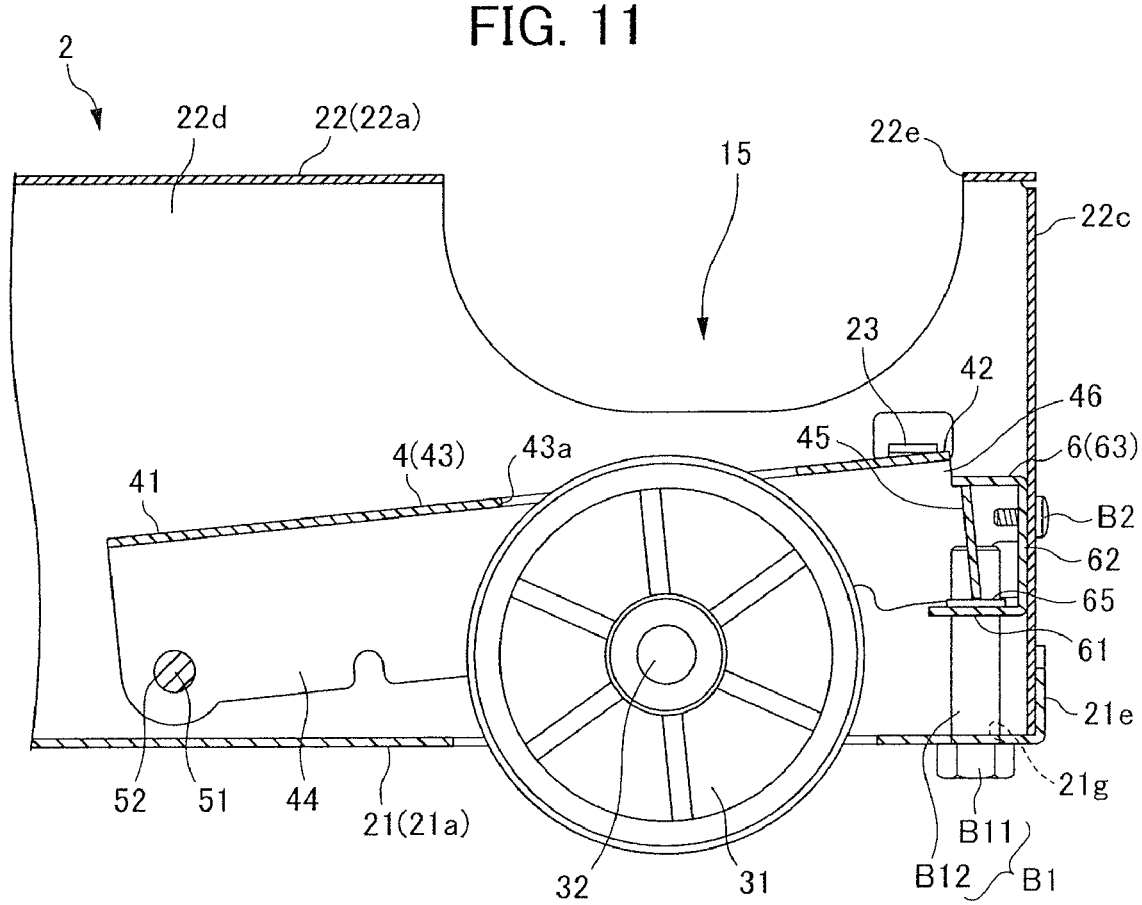
FIG. 11 is a cross-sectional view showing a state where height of the base portion is adjusted to be low in relation to a wheel (this drawing corresponds to FIG. 6).
Figure 12:
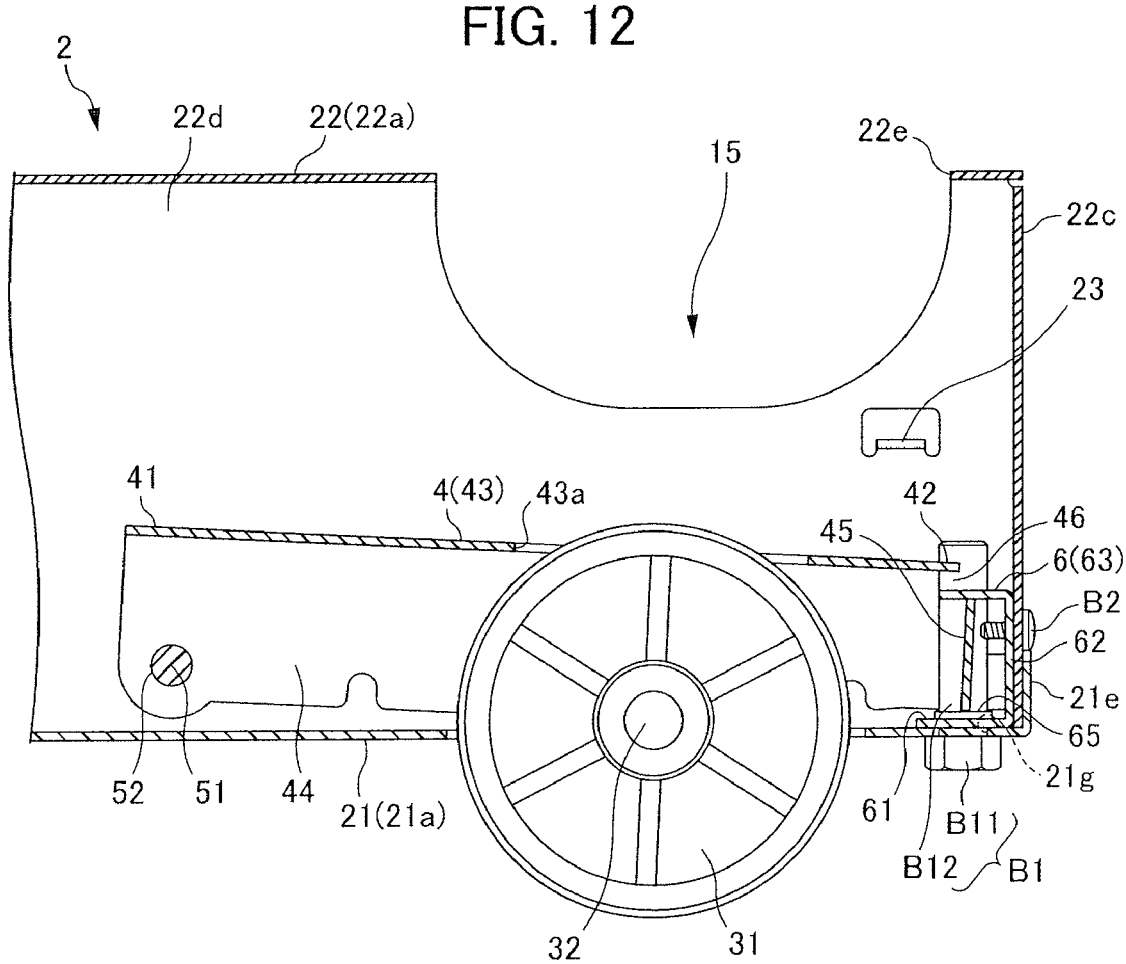
FIG. 12 is a cross-sectional view showing a state where the height of the base portion is adjusted to be high in relation to the wheel (this drawing corresponds to FIG. 6).

FIG. 9 is a view showing a state where a pivot restriction member 6 is detached from a wheel mounting member 4. FIG. 10A is a perspective view of the pivot restriction member 6. FIG. 10B is a perspective view of the pivot restriction member 6 seen from an opposite side of FIG. 10A. FIG. 11 is a cross-sectional view showing a state where height of the base portion 2 is adjusted to be low in relation to a wheel 31 (this drawing corresponds to FIG. 6). FIG. 12 is a cross-sectional view showing a state where the height of the base portion 2 is adjusted to be high in relation to the wheel 31 (this drawing corresponds to FIG. 6).

As shown in FIG. 3 and FIG. 4, the four wheels 31 are respectively provided to four corners of the base portion 2. The wheel supporting mechanism 15 of the present embodiment supports the wheels 31 that protrude downward from the bottom face 21a of the base portion 2 in the housing 11. The wheel supporting mechanism 15 is provided with an axle 32, a wheel mounting member, a pivot supporting portion 5, a pivot restriction member 6, and a height adjustment male screw B1 that is an adjustment member.

First, the base portion 2 is described in detail. As shown in FIG. 3 to FIG. 5, the bottom face 21a of the base portion 2 is formed of the bottom surface member 21. The bottom face 21a of the base portion 2 is a bottom face of the entire housing 11. It should be noted that the shape of this bottom face may be a plane surface or a curved surface. The entire external shape of the bottom surface member 21 is rectangular.

The outer edge of the bottom surface member 21 is bent upward from the bottom face 21a, thereby forming a first outer wall 21e along the front-back direction, and a second outer wall 21f along the left-right direction.

The central portion of the bottom surface member 21 is open and is separated from the first outer wall 21e. The open central portion of the bottom surface member 21 forms a rectangular opening 21d. The outer edge along the front-back direction in the opening 21d is bent upward from the bottom face 21a, thereby forming a first inner wall 21b. The outer edge along the left-right direction in the opening 21d is bent upward from the bottom face 21a, thereby forming a second inner wall 21c.

The wheel enclosure member 22 is provided to the front side and the back side of the bottom surface member 21, so as to extend along the second outer wall 21f. The length of the wheel enclosure member 22 is substantially the same as the width of the bottom surface member 21 in the left-right direction. The wheel enclosure member 22 is substantially shaped like a box with an open bottom. The wheel enclosure member 22 substantially encloses the wheels 31 in a portion positioned above the bottom face 21a of the bottom surface member 21. The wheel enclosure member 22 is provided with a top face portion 22a forming a top face thereof, an outer face portion 22b forming an outer face in the front-back direction thereof, side face portions 22c and 22c forming outer faces in the left-right direction thereof, and an inner face portion 22d forming an inner face in the front-back direction thereof. Openings 22e are respectively formed in regions substantially overlapping with the wheels 31 in a planar view of the wheel enclosure member 22. The openings 22e are open so as to extend from the inner face portion 22d via the top face portion 22a to the outer face portion 22b.

The second outer wall 21f of the bottom surface member 21 is screwed to the outer face portion 22b of the wheel enclosure member 22, and the second inner wall 21c of the bottom surface member 21 is screwed to the inner face portion 22d of the wheel enclosure member 22, thereby connecting the bottom surface member 21 and the wheel enclosure member 22.

Locking tongues (locking portions) 23 are provided in pairs to the outer face portion 22b and the inner face portion 22d of the wheel enclosure member 22. The pair of locking tongues 23, which are positioned more outwardly than the wheels 31 in the left-right direction, protrude from the inner face of the outer face portion 22b and from the inner face of the inner face portion 22d respectively, so as to face each other toward the inside of the wheel enclosure member 22. A part of the outer face portion 22b or the inner face portion 22d is clipped in a shape of a Greek capital letter "Π", and this clipped portion is bent, thereby forming the locking tongue 23. The locking tongues 23 are provided in order to restrict excessive pivoting of the wheel mounting member 4 to the upward direction as described later.

Height adjustment male screws B1, which extend in the height direction of the housing 11, are combined to the base portion 2. Each of the height adjustment male screws B1 consists of a screw bolt having a head portion B11 and a male-threaded shank B12. The height adjustment male screw B1 is an adjustment member, which is connected to the pivot restriction member 6, and which adjusts the height of the housing 11 in relation to the wheels 31. The height adjustment male screw B1 is movable in the height direction of the housing 11, and connects the pivot restriction member 6 to the housing 1.

As shown in FIG. 3 and FIG. 6, the shank B12 of the height adjustment male screw B1 is inserted into a through-hole 21g formed in the bottom surface member 21 (the bottom face 21a). In a state where the post-processing apparatus 1 is placed on a floor F, the height adjustment male screw B1 is pulled upward via a first female screw portion 65 of the pivot restriction member 6 as described later. In this state, the head portion B11 of the height adjustment male screw B1 is engaged with the through-hole 21g of the bottom surface member 21 (the bottom face 21a around the through-hole 21g), a result of which the height adjustment male screw B1 does not drop out of the bottom face 21a. Accordingly, the distance between the head portion B11 of the height adjustment male screw B1 and the first female screw portion 65 is adjusted, thereby making it possible to restrict the pivoting range of the wheel mounting member 4.

A long hole 24 is formed as a slit extending in the vertical direction (in other words, a direction along a scale 26) on the side face portion 22c of the wheel enclosure member 22. A height fixing male screw B2 (to be described later) is inserted into the long hole 24 so as to be movable in the vertical direction.

The scale 26 is provided adjacently to the long hole 24 on the side face portion 22c of the wheel enclosure member 22. In other words, the height fixing male screw B2 is movable along the scale 26. The scale 26 is used in order to confirm the position of the height fixing male screw B2 in the long hole 24 as described later.

Next, a configuration of the wheel supporting mechanism 15 of the present embodiment is described. As shown in FIG. 3 and FIG. 4, out of the four wheels 31, the two wheels 31 are arranged in the front side of the housing 11, while the other two wheels 31 are arranged in the back side of the housing 11. The axle 32 extends from the wheel 31 to the direction of the rotation axis of the wheel 31. The direction in which the axle 32 extends is the front-back direction of the housing 11.

As shown in FIG. 6 to FIG. 10B, the wheel mounting member 4 has a bearing 33 for rotatably supporting the axle 32. The wheel mounting member 4 is a long member having a first end portion 41 and a second end portion 42. The second end portion 42 is an end portion opposite to the first end portion 41 with the bearing 33 positioned therebetween. In other words, the bearing 33 is positioned between the first end portion 41 and the second end portion 42. In the present embodiment, the bearing 33 is in a position that is closer to the second end portion 42, as compared to the intermediate position between the first end portion 41 and the second end portion 42.

The axle 32 is rotatably supported by the bearing 33, a result of which the wheels 31 are rotatably supported by the wheel mounting member 4. The wheel mounting member 4 is a member that is shaped like a box with an open bottom. The longitudinal direction of the wheel mounting member 4 corresponds to the left-right direction of the housing 11. The wheel mounting member 4 has the first end portion 41 and the second end portion 42 in the longitudinal direction thereof. The first end portion 41 is an end portion that is in an inner side of the left-right direction of the housing 11. The second end portion 42 is an end portion that is in an outer side of the left-right direction of the housing 11. The wheel mounting member 4 is provided with a top face portion 43 forming a top face thereof, a pair of side face portions 44 and 44, and a pair of facing tongues 45 and 45. The pair of side face portions 44 respectively hangs from the front side edge and the back side edge of the top face portion 43 of the front-back direction of the housing 11. A pair of facing tongues 45 is tongues protruding in the facing direction from edges on the side of the second end portion 42 in the pair of side face portions 44 and 44. A first engagement portion 46 is formed between the top face portion 43 and an upper edge of the facing tongues 45, and a second engagement portion 63 (to be described later in detail) of the pivot restriction member 6 can be inserted into the first engagement portion 46. In other words, the first engagement portion 46 is provided to the vicinity of the second end portion 42. The vicinity of the second end portion 42 refers to a portion in a range within 10 mm from the second end portion 42.

The top face portion 43 is provided with a top face opening 43a in a region corresponding to the wheel 31. The top face opening 43a is provided in order that a top part of the wheel 31 protrudes above the top face (the top face portion 43) of the wheel mounting member 4. Accordingly, the top part of the wheel 31 protrudes from the top face portion 43 through the top face opening 43a.

The bearings 33 are respectively provided (in a pair) to the pair of side face portions 44 and 44, corresponding to the axle 32. A part of the lower edge of the side face portion 44 protrudes downward in a shape of a semi-circle, and the protruded portion is provided with a hole having a dimension corresponding to the axle 32, thereby forming the bearing 33.

Next, the pivot supporting portion 5 is described. As shown in FIG. 6 to FIG. 10B, the pivot supporting portion 5 is provided to the vicinity of the first end portion 41 of the wheel mounting member 4. The pivot supporting portion 5 pivotally supports the wheel mounting member 4 in relation to the housing 11 (the base portion 2). The vicinity of first end portion 41 refers to a portion in a range within 15 mm from the first end portion 41.

In the present embodiment, the pivot supporting portion 5 pivotally supports the wheel mounting member 4 in relation to the wheel enclosure member 22. The pivot supporting portion 5 consists of a bearing shaft 51, and first holes 52. The first holes 52 are provided to the vicinity of the first end portion 41 in the side face portion 44 of the wheel mounting member 4. The second holes 53 are respectively provided to the outer face portion 22b and to the inner face portion 22d of the wheel enclosure member 22. The bearing shaft 51 is inserted through the first holes 52 and the second holes 53, and is rotatably supported. With such a configuration, the pivot supporting portion 5 pivotally supports the wheel mounting member 4 in relation to the wheel enclosure member 22.

Next, the pivot restriction member 6 is described. As shown in FIG. 6 to FIG. 10B, the pivot restriction member 6 is engaged with the vicinity of the second end portion 42 of the wheel mounting member 4, thereby restricting the pivoting of the wheel mounting member 4. The pivot restriction member 6 is provided with the first female screw portion 65 screwed into the height adjustment male screw B1, and the second engagement portion 63 engaged with the first engagement portion 46. In the pivot restriction member 6, the first female screw portion 65 is screwed into the shank B12 of the height adjustment male screw B1 (the height adjustment male screw B1 is rotated), thereby adjusting a movable range of the pivot restriction member 6, and making it possible to adjust the height of the housing 11 (the base portion 2) in relation to the wheel 31. Moreover, the first engagement portion 46 is engaged with the second engagement portion 63, a result of which the pivot restriction member 6 can hold the wheel mounting member 4. The pivot restriction member 6 is provided to all the wheels 31 correspondingly, and independently restricts the pivoting of the wheel mounting member 4.

In the present embodiment, the pivot restriction member 6 mainly consists of a base plate portion 61, a side plate portion 62, and the second engagement portion 63 consisting of an upper plate portion. The pivot restriction member 6 is a member having a shape of a Greek capital letter "Π" in a front view. The base plate portion 61 has a substantially rectangular shape, and is provided with, in the central portion thereof, the first female screw portion 65, into which the shank B12 of the height adjustment male screw B1 is screwed. The side plate portion 62 stands up from an outer edge of the base plate portion 61 in the left-right direction of the housing 11. The side plate portion 62 is provided with the two second female screw portions 66 in the front-back direction. The height fixing male screw B2 as a scale indication member (to be described later) is screwed into the second female screw portion 66. In other words, the pivot restriction member 6 is provided with the scale indication member. It should be noted that a purpose for providing the two second female screw portions 66 to the one pivot restriction member 6 is to achieve commonality of the pivot restriction member 6.

The second engagement portion 63 protrudes from an upper edge of the side plate portion 62 to the inner side of the left-right direction of the housing 11. In other words, the base plate portion 61 protrudes from the lower edge of the side plate portion 62 in the same direction in relation to the side plate portion 62. Moreover, the second engagement portion 63 protrudes from an upper edge of the side plate portion 62 in the same direction in relation to the side plate portion 62.

The central portion in the front-back direction of the second engagement portion 63 is concave outwardly from the inner edge of the left-right direction of the second engagement portion 63, thereby forming a concave portion 63a. The concave portion 63a is provided in order to avoid a contact of the second engagement portion 63 with the height adjustment male screw B1. As described later, the second engagement portion 63 is inserted into, and engaged with, the first engagement portion 46 of the wheel mounting member 4.

The pivot restriction member 6 is further provided with restriction plates 64 and 64. The restriction plates 64 and 64 protrude inward to the left-right direction, from a lower part of the front edge and from a lower part of the back edge of the side plate portion 62, respectively. The restriction plates 64 secure (restrict) the distance from the facing tongues 45 of the wheel mounting member 4, in a state where the height fixing male screw B2 is loosened.

The height adjustment male screw B1 is screwed into the first female screw portion 65, a result of which the pivot restriction member 6 combined with the height adjustment male screw B1 moves in the height direction of the housing 11. This makes it possible for the pivot restriction member 6 to adjust the height of the pivot restriction member 6 in relation to the wheel 31. The height adjustment male screw B1 is rotated in relation to the first female screw portion 65, thereby making it possible to adjust the height of the pivot restriction member 6 in relation to the wheel 31.

The height fixing male screw B2 is tightly screwed to the second female screw portion 66, thereby the pivot restriction member 6 is fixed to the side face portion 22c of the wheel enclosure member 22. In other words, the height fixing male screw B2 is also provided with a function to fix the pivot restriction member 6 to the housing 11. Moreover, the height fixing male screw B2 is inserted into the long hole 24, thereby making it possible to adjust the height of the height fixing male screw B2 in relation to the housing 11 (the wheel enclosure member 22 in particular).

In the wheel supporting mechanism 15, it is possible to visually confirm the height of the pivot restriction member 6 in relation to the housing 11 by using the scale 26. In other words, the height fixing male screw B2 is aligned with the scale 26, thereby making it possible to adjust the height of the pivot restriction member 6 in relation to the housing 11.

When the post-processing apparatus 1 of the present embodiment having the aforementioned configuration is placed on the floor F (see FIG. 1), a reaction force from the floor F reaches the wheel mounting member 4 through the wheels 31, the axles 32, and the bearings 33. As a result, the bearings 33 in the wheel mounting members 4 are pressed upward. The wheel mounting member 4 is pivotally supported by the pivot supporting portion 5 in the vicinity of the first end portion 41. Accordingly, the second end portion 42 of the wheel mounting member 4 is pivoted upward with the bearing shaft 51 of the rotation supporting portion 5 as the pivot center thereof.

On the other hand, the second engagement portion 63 of the pivot restriction member 6 is inserted into the first engagement portion 46 of the wheel mounting member 4, a result of which the first engagement portion 46 is engaged with the second engagement portion 63. Moreover, in a state where the pivot restriction member 6 reaches a predetermined height by threadedly engaging the height adjustment male screw B1 with the first female screw portion 65, the height fixing male screw B2 is fastened to the second female screw portion 66, a result of which the pivot restriction member 6 is fixed to the side face portion 22c of the wheel enclosure member 22. Here, in a state where the height adjustment male screw B1 is pulled upward by means of the first female screw portion 65 of the pivot restriction member 6, the head portion B11 of the height adjustment male screw B1 is engaged with the bottom face 21a of the bottom surface member 21.

Accordingly, the upper edges of the facing tongues 45 of the wheel mounting member 4 abut on the underside of the second engagement portion 63 of the pivot restriction member 6. Thus, the pivot restriction member 6 restricts the pivoting of the wheel mounting member 4 with the pivot supporting portion 5 as the pivot center thereof. This determines the height of the vicinity of the second end portion 42 in the wheel mounting member 4 in relation to the wheel 31. As a result, this also determines the height of the housing 11 (the base portion 2) that supports the wheel mounting member 4 via the pivot supporting portion 5.

Next, a procedure for adjusting the height of the housing 11 in relation to the wheels 31 in the post-processing apparatus 1 of the present embodiment is described. For example, as shown in FIG. 1, in a case where the post-processing apparatus 1 is placed on the floor F, the height of the post-processing apparatus 1 in relation to the image forming apparatus main unit M2 may be higher than a desired height in some cases. In such a case, it is desirable to decrease the height of the housing 11 of the post-processing apparatus 1 in relation to the wheels 31. For example, it is possible to decrease the height of the housing 11 in relation to the wheels 31 by the following procedure.

First, as shown in FIG. 11, the height fixing male screw B2 is loosened, thereby making it possible to move the pivot restriction member 6 in the vertical direction. It should be noted that the degree of freedom of the movement of the pivot restriction member 6 is restricted (determined) by the shape and the like of the long hole 24. Next, the height adjustment male screw B1 is rotated in a direction to be loosened in relation to the first female screw portion 65 of the pivot restriction member 6. As a result, the head portion B11 of the height adjustment male screw B1 is separated away from the first female screw portion 65.

Now, in a state where the post-processing apparatus 1 is placed on the floor F (see FIG. 1), the first engagement portion 46 (the facing tongues 45) of the wheel mounting member 4 always tends to move upward due to a reaction force which the wheel 31 receives from the floor F. As a result, the second engagement portion 63 of the pivot restriction member 6 is pressed upward to the first engagement portion 46 (the facing tongues 45) of the wheel mounting member 4. Here, the pivot restriction member 6 moves upward until the head portion B11 of the height adjustment male screw B1 abuts on the bottom face 21a of the base portion 2. In this way, the vicinity of the second end portion 42 in the wheel mounting member 4 is separated away from the bottom surface member 21 of the base portion 2. This relatively decreases the height of the vicinity of the bottom face 21a of the base portion 2 in relation to the wheel 31.

It should be noted that, once the top face portion 43 is locked by the locking tongues 23, the vicinity of the second end portion 42 in the wheel mounting member 4 does not further move upward. In other words, the locking tongues 23 lock the vicinity of the second end portion 42 above the wheel mounting member 4, and restrict the pivoting of the wheel mounting member 4.

Moreover, the pivot restriction member 6 is fixed to the side face portion 22c by tightly screwing the height fixing male screw B2, thereby making it possible to set, by using the scale 26, the height of the vicinity of the second end portion 42 in the wheel mounting member 4 in relation to the wheel 31, as well as the height of the housing 11 (the base portion 2) in relation to the wheel 31 as a result thereof.

In contrast to the aforementioned procedure, it is possible to increase the height of the housing 11 (the base portion 2) in relation to the wheel 31 by the following procedure. First, the height fixing male screw B2 is loosened, thereby making it possible to move the pivot restriction member 6 in the vertical direction. Next, the height adjustment male screw B1 is rotated in a direction to be screwed to the first female screw portion 65 of the pivot restriction member 6. This reduces the distance between the head portion B11 of the height adjustment male screw B1 and the first female screw portion 65.

Now, in a state where the post-processing apparatus 1 is placed on the floor F (see FIG. 1), the first engagement portion 46 (the facing tongues 45) of the wheel mounting member 4 always tends to move upward due to a reaction force which the wheel 31 receives from the floor. As a result, the second engagement portion 63 of the pivot restriction member 6 is pressed upward to the first engagement portion 46 (the facing tongues 45) of the wheel mounting member 4. Here, the pivot restriction member 6 moves upward until the head portion B11 of the height adjustment male screw B1 abuts on the bottom face 21a of the base portion 2. As compared to the state shown in FIG. 11, the distance between the head portion B11 of the height adjustment male screw B1 and the first female screw portion 65 is shorter, a result of which the vicinity of the second end portion 42 in the wheel mounting member 4 is closer to the bottom surface member 21 of the base portion 2. This relatively increases the height of the vicinity of the bottom face 21a of the base portion 2 in relation to the wheel 31.

It should be noted that, once the base plate portion 61 of the pivot restriction member 6 abuts on the top face of the bottom surface member 21, the vicinity of the second end portion 42 in the wheel mounting member 4 does not further move downward. Moreover, the pivot restriction member 6 is fixed to the side face portion 22c by tightly screwing the height fixing male screw B2, thereby making it possible to set, by using the scale 26, the height of the vicinity of the second end portion 42 in the wheel mounting member 4 in relation to the wheel 31, as well as the height of the housing 11 (the base portion 2) in relation to the wheel 31 as a result thereof.

According to the post-processing apparatus 1 of the first embodiment, it is possible to easily adjust the height of the housing 11 in relation to the wheels 31 by the aforementioned procedures and the like, yet with a simple configuration.

Moreover, according to the post-processing apparatus 1 of the second embodiment, it is possible to easily adjust the height of the housing 11 in relation to the wheels 31, for example, by rotating the height adjustment male screw B1 in relation to the first female screw portion 65.

Moreover, according to the post-processing apparatus 1 of the third embodiment, it is possible to restrict excessive upward pivoting of the wheel mounting member 4, even in a state where the pivot restriction member 6 is not held to the housing 11.

Moreover, according to the post-processing apparatus 1 of the fourth embodiment, for example, a value of the scale 26 is determined so that the height of the pivot restriction member 6 corresponding to one of the wheels 31 is set to be a desired height, and the determined value is applied to the pivot restriction members 6 respectively corresponding to the other three wheels 31, thereby making it possible to easily adjust the height of the pivot restriction members 6 respectively corresponding to all the wheels 31.

Moreover, according to the post-processing apparatus 1 of the fifth embodiment, for example, when the post-processing apparatus 1 provided with the wheel supporting mechanism 15 is transported, an effect can be achieved in which the wheels 31 do not tend to jounce.

Moreover, according to the post-processing apparatus 1 of the sixth embodiment, for example, an effect is achieved which makes it possible to increase the diameter of the wheel 31 without being limited by the dimension of the wheel mounting member 4.

Moreover, Therefore, according to the post-processing apparatus 1 of the seventh embodiment, it is possible to adjust, for each of the wheels 31, the height of the housing 11 in the vicinity thereof. For example, it is effective for a case where the post-processing apparatus 1 is placed on a floor F with irregularities or an inclined floor F.

Although the preferred embodiment of the present disclosure has been described, the present disclosure can be implemented in various forms without being limited to the aforementioned embodiment.

For example, the aforementioned embodiment is configured in which the relative position of the pivot restriction member 6 and the housing 11 is adjusted and fixed by using the threaded engagement of the screws, thereby making it possible to adjust the height of the housing 11 in relation to the wheels 31; however, the configuration for adjusting the height is not limited thereto.

The axial direction of the height adjustment male screw B1 is not limited to the vertically upward direction, and may be slightly inclined in relation to the vertical line. The type of the image forming apparatus M1 (the image forming apparatus main unit M2) is not limited in particular, and may be a copying machine, a printer, a facsimile, or combined machine thereof. The wheel supporting mechanism of the present disclosure can be applied to a wheel supporting mechanism in an apparatus other than the post-processing apparatus 1.

What is claimed is:

1. A wheel supporting mechanism, comprising:
    a wheel supporting a housing in a state where the wheel protrudes from a bottom face of the housing;
    an axle extending from the wheel;
    a wheel mount, which has a bearing rotatably supporting the axle, and which has a first end portion and a second end portion that is on an opposite side of the first end portion with the bearing positioned therebetween;
    a pivot support, which is provided in a vicinity of the first end portion in the wheel mount, and which pivotally supports the wheel mount in relation to the housing;
    a pivot restrictor that restricts pivoting of the wheel mount by being engaged with a vicinity of the second end portion;

an adjuster that adjusts a height of the housing in relation to the wheel by restricting a pivoting range of the wheel mount by fixing the pivot restrictor to the housing; and an enclosure that substantially encloses the pivot restrictor, wherein the wheel mount is provided with a first engagement portion in the vicinity of the second end portion, the pivot restrictor is provided with a second engagement portion that is engaged with the first engagement portion, and the first engagement portion and the second engagement portion, when both are engaged, restrict an upward and downward pivoting range of the wheel mount, and hold the wheel mount;

wherein the housing is provided with a through-hole in the bottom face thereof, the adjuster is formed of a screw bolt having a head portion and a shank threaded as a male screw, the pivot restrictor is provided with a female screw portion that screwed into the male screw, the shank of the screw bolt is screwed into the female screw portion through the through-hole, and the head portion is engaged with a peripheral portion of the through-hole, thereby connecting the pivot restrictor to the housing so as to be movable in a height direction, and rotation of the screw bolt adjusts a movable range of the pivot restrictor, and restricts a pivoting range of the wheel mount.

2. The wheel supporting mechanism according to claim 1, comprising a lock, which locks the vicinity of the second end portion above the wheel mount, and which restricts pivoting of the wheel mount.

3. The wheel supporting mechanism according to claim 1, wherein the housing is provided with a scale, the pivot restrictor is provided with a scale indicator, the scale indicator is movable along the scale, and height of the pivot restrictor in relation to the housing can be visually confirmed by aligning the scale indicator with the scale.

4. The wheel supporting mechanism according to claim 3, wherein the housing is provided with a slit along the scale, and the scale indicator is configured with a screw that is movable in the slit and can hold the pivot restrictor in the housing by fastening the pivot restrictor to the housing via the slit.

5. The wheel supporting mechanism according to claim 1, wherein the wheel mount has a top face portion, and the top face portion is provided with a top face opening, through which a top part of the wheel can protrude above the top face of the wheel mount.

6. The wheel supporting mechanism according to claim 1, wherein a plurality of the wheels is provided to the housing, and the pivot restrictor is provided to all the wheels correspondingly, and independently restricts the pivoting of the wheel mount.

7. A post-processing apparatus of an image forming apparatus, comprising a wheel supporting mechanism, which is provided with:

a wheel supporting a housing in a state where the wheel protrudes from a bottom face of the housing;

an axle extending from the wheel;

a wheel mount, which has a bearing rotatably supporting the axle, and which has a first end portion and a second end portion that is on an opposite side of the first end portion with the bearing positioned therebetween;

a pivot supporting portion, which is provided in a vicinity of the first end portion in the wheel mount, and which pivotally supports the wheel mount in relation to the housing;

a pivot restrictor that restricts pivoting of the wheel mount by being engaged with a vicinity of the second end portion;

an adjustor that adjusts a height of the housing in relation to the wheel by restricting a pivoting range of the wheel mount by fixing the pivot restrictor to the housing; and an enclosure that substantially encloses the pivot restrictor, wherein the wheel mount is provided with a first engagement portion in the vicinity of the second end portion, the pivot restrictor is provided with a second engagement portion that is engaged with the first engagement portion, and the first engagement portion and the second engagement portion, when both are engaged, restrict an upward and downward pivoting range of the wheel mount, and hold the wheel mount;

wherein the housing is provided with a through-hole in the bottom face thereof, the adjuster is formed of a screw bolt having a head portion and a shank threaded as a male screw, the pivot restrictor is provided with a female screw portion that screwed into the male screw, the shank of the screw bolt is screwed into the female screw portion through the through-hole, and the head portion is engaged with a peripheral portion of the through-hole thereby connecting the pivot restrictor to the housing so as to be movable in a height direction, and rotation of the screw bolt adjusts a movable range of the pivot restrictor, and restricts a pivoting range of the wheel mount.

8. An image forming apparatus that is configured by connecting:

an image forming apparatus main unit;

and a post-processing apparatus that is provided with a wheel supporting mechanism, which is provided with:

a wheel supporting a housing in a state where the wheel protrudes from a bottom face of the housing;

an axle extending from the wheel;

a wheel mount, which has a bearing rotatably supporting the axle, and which has a first end portion and a second end portion that is on an opposite side of the first end portion with the bearing positioned therebetween;

a pivot supporting portion, which is provided in a vicinity of the first end portion in the wheel mount, and which pivotally supports the wheel mount in relation to the housing;

a pivot restrictor that restricts pivoting of the wheel mount by being engaged with a vicinity of the second end portion;

an adjustor that adjusts a height of the housing in relation to the wheel by restricting a pivoting range of the wheel mount by fixing the pivot restrictor to the housing; and an enclosure that substantially encloses the pivot restrictor, wherein the wheel mount is provided with a first engagement portion in the vicinity of the second end portion, the pivot restrictor is provided with a second engagement portion that is engaged with the first engagement portion, and the first engagement portion and the second engagement portion, when both are engaged, restrict an upward and downward pivoting range of the wheel mount, and hold the wheel mount;

wherein the housing is provided with a through-hole in the bottom face thereof, the adjuster is formed of a screw bolt having a head portion and a shank threaded as a male screw, the pivot restrictor is provided with a female screw portion that screwed into the male screw, the shank of the screw bolt is screwed into the female screw portion through the through-hole, portion is engaged with a peripheral portion of the through-hole thereby connecting the pivot restrictor to the housing so as to be movable in a height direction, and rotation of the screw bolt adjusts a movable range of the pivot restrictor, and restricts a pivoting range of the wheel mount.

* * * * *